(12) United States Patent
Kuo et al.

(10) Patent No.: US 7,386,236 B1
(45) Date of Patent: Jun. 10, 2008

(54) MULTIPLE WAVELENGTH TDMA OPTICAL NETWORK

(75) Inventors: Jer-Chen Kuo, Davis, CA (US); Gerald A. Pesavento, Davis, CA (US)

(73) Assignee: Alloptic, Inc., Livermore, CA (US)

( * ) Notice: Subject to any disclaimer, the term of this patent is extended or adjusted under 35 U.S.C. 154(b) by 1164 days.

(21) Appl. No.: 09/670,630

(22) Filed: Sep. 27, 2000

Related U.S. Application Data

(60) Provisional application No. 60/155,892, filed on Sep. 27, 1999.

(51) Int. Cl.
*H04J 14/08* (2006.01)

(52) U.S. Cl. .............................. 398/99; 398/72; 398/71; 398/70; 398/66; 398/67; 398/68; 398/69; 398/73; 398/75; 398/76; 398/77; 398/78; 398/79; 398/100; 398/98; 398/89; 398/91; 370/321; 370/337; 370/108; 370/442; 370/230; 370/347

(58) Field of Classification Search .................. 398/58, 398/99 X, 168 X, 167.5, 136, 75 X, 100 X, 398/66–72, 79, 98, 73, 75, 76, 77, 78, 89, 398/91, 100, 99; 370/230, 442, 108, 347, 370/321, 337

See application file for complete search history.

(56) References Cited

U.S. PATENT DOCUMENTS

| | | | |
|---|---|---|---|
| 4,441,180 A | 4/1984 | Schüssler | |
| 4,467,468 A | 8/1984 | Miller | |
| 4,726,010 A | 2/1988 | Ali et al. | |
| 4,730,888 A | 3/1988 | Darcie et al. | |
| 4,889,404 A * | 12/1989 | Bhagavatula et al. | ......... 398/79 |
| 5,005,166 A | 4/1991 | Suzuki et al. | |
| 5,175,640 A | 12/1992 | Eng et al. | |
| 5,208,691 A | 5/1993 | Nishio | |
| 5,311,344 A | 5/1994 | Bohn et al. | |
| 5,369,515 A | 11/1994 | Majima | |
| 5,396,357 A | 3/1995 | Goossen et al. | |
| 5,404,240 A | 4/1995 | Nishio et al. | |
| 5,483,368 A * | 1/1996 | Ohshima | ...................... 398/79 |
| 5,517,232 A | 5/1996 | Heidemann et al. | |
| 5,523,870 A * | 6/1996 | Suzuki et al. | ................ 398/100 |
| 5,548,431 A | 8/1996 | Shin et al. | |
| 5,615,035 A | 3/1997 | Koai | |
| 5,647,035 A | 7/1997 | Cadeddu et al. | |
| 5,745,269 A | 4/1998 | Chawki et al. | |
| 5,748,815 A | 5/1998 | Hamel et al. | |
| 5,760,934 A | 6/1998 | Sutter et al. | |

(Continued)

*Primary Examiner*—Hanh Phan
(74) *Attorney, Agent, or Firm*—John Nielsen; Randick O'Dea and Tooliatos, LLP

(57) ABSTRACT

A passive optical network which employs multiple wavelengths to increase overall system bandwidth, with each wavelength being shared by multiple optical network units (ONUs) according to a time division multiple access (TDMA) protocol. The upstream TDMA traffic therefore includes multiple TDMA data streams at different wavelengths. An optical line terminal (OLT) preferably receives the multiple TDMA data streams and separates them to different detectors before ultimately combining all data into a single data stream using a multiplexer after performing clock and data recovery functions. In this manner, the upstream bandwidth in a passive optical network can be markedly increased without requiring an increase in data transmit speeds, and while using low cost/low speed detectors in the OLT, and low cost/low speed transceivers in the ONUs. System bandwidth can be further improved by using higher cost, higher speed components.

19 Claims, 4 Drawing Sheets

U.S. PATENT DOCUMENTS

| | | |
|---|---|---|
| 5,764,821 A | 6/1998 | Glance |
| 5,774,244 A | 6/1998 | Tandon et al. |
| 5,786,913 A | 7/1998 | Pfeiffer |
| 5,796,501 A | 8/1998 | Sotom et al. |
| 5,854,698 A | 12/1998 | Eskildsen et al. |
| 5,872,645 A * | 2/1999 | Proctor ........................ 398/99 |
| 5,903,371 A | 5/1999 | Arecco et al. |
| 5,907,417 A | 5/1999 | Darcie et al. |
| 5,912,749 A | 6/1999 | Harstead et al. |
| 5,930,262 A * | 7/1999 | Sierens et al. .............. 370/442 |
| 5,933,258 A | 8/1999 | Flanagan et al. |
| 5,943,148 A | 8/1999 | Hamel et al. |
| 5,943,150 A | 8/1999 | Deri et al. |
| 6,272,130 B1 * | 8/2001 | Panahi et al. ................ 370/366 |
| 6,359,725 B1 * | 3/2002 | Islam ........................ 359/334 |
| 6,411,410 B1 * | 6/2002 | Wright et al. ................. 398/79 |
| 6,498,667 B1 * | 12/2002 | Masucci et al. .............. 398/98 |
| 6,546,014 B1 * | 4/2003 | Kramer et al. .............. 370/449 |
| 6,592,272 B1 * | 7/2003 | Masucci et al. .............. 398/47 |
| 6,619,865 B1 * | 9/2003 | Takai et al. ................... 398/68 |

\* cited by examiner

MULTIPLE WAVELENGTH TDMA OPTICAL NETWORK

CROSS REFERENCE TO RELATED APPLICATION

This application claims priority to U.S. Provisional Application No. 60/155,892 filed Sep. 27, 1999, the entire disclosure of which is incorporated herein by reference.

FIELD OF THE INVENTION

This invention relates primarily to passive optical networks and, more particularly, to passive optical networks utilizing multiple TDMA data streams of different wavelengths over the same optical transmission line for increased bandwidth and/or reduced system complexity and cost.

BACKGROUND OF THE INVENTION

Point-to-multipoint passive optical networks are commonly deployed in telecommunications and cable television local access networks. As shown in FIG. 1A, a typical passive optical network includes an optical line terminal (OLT), often located in a Central Office, and multiple optical network units (ONUs) which are usually located near end-users/subscribers for delivering information (such as voice, data and/or video) services. One or more passive optical splitters are commonly used to distribute signals to/from the OLT from/to the ONUs. Because these optical networks do not require an optical-to-electrical-to-optical conversion at each node, but rather rely on passive optical components, they are considered more reliable than active optical networks.

In the downstream direction (i.e., from the OLT to the ONUs), the passive optical network is a broadcast system; traffic inserted at the OLT is sent to all ONUs. In the upstream direction (i.e., from the ONUs to the OLT), a time division multiple access (TDMA) protocol is frequently used to coordinate the sending of multiple signals to the same OLT point. This is shown generally in FIG. 1B, which illustrates the TDMA data stream received at the OLT.

In general, increasing the upstream communication bandwidth for a fully-loaded passive optical network requires an increase in data transmit speeds. However, higher data speeds typically require more complex and thus expensive electronics for managing packet alignment and performing packet tracking and synchronization. Further, higher data speeds usually require higher speed, higher cost optical transmitters in the ONUs. For these reasons, there are practical limitations on the extent to which bandwidth can be increased in passive optical networks employing current TDMA technology.

As an alternative to TDMA protocols, wavelength division multiplexing (WDM) can be used to provide an ONU with increased upstream bandwidth. However, a system employing WDM requires multiple optical transmitters with closely spaced wavelengths, with each ONU being assigned a unique wavelength. WDM is therefore an expensive solution to bandwidth problems because of the high cost of wavelength specific lasers and multi-channel demultiplexing equipment.

SUMMARY OF THE INVENTION

In order to solve these and other needs in the art, the inventor hereof has designed an advanced, low-cost, high bandwidth, multiple access technology for passive optical networks. Rather than sharing the bandwidth available over a single wavelength among all ONUs, or assigning each ONU its own unique wavelength, the present invention provides a passive optical network in which multiple wavelengths are used to increase overall system bandwidth, with each wavelength being shared by multiple ONUs according to a TDMA protocol. The upstream TDMA traffic therefore includes multiple TDMA data streams at different wavelengths. The OLT preferably receives the multiple TDMA data streams and separates them to different detectors before ultimately combining all data into a single data stream using a multiplexer after performing clock and data recovery functions. In this manner, the upstream bandwidth in a passive optical network can be markedly increased without requiring an increase in data transmit speeds. It therefore follows that upstream bandwidth in a passive optical network can be increased significantly while using low cost/low speed detectors, and low cost/low speed transceivers in the ONUs, although system bandwidth can be further improved by using higher cost, higher speed components, as apparent.

According to one aspect of the present invention, an optical communication network includes an optical transmission line, an optical line terminal connected to the optical transmission line, a first plurality of optical network units each connected to the optical line terminal and configured for optically transmitting TDMA signals of a first wavelength to the optical line terminal through the optical transmission line, and at least a second plurality of optical network units configured for optically transmitting TDMA signals of a second wavelength different than the first wavelength to the optical line terminal through the optical transmission line.

According to another aspect of the present invention, an optical communication network includes an optical transmission line, an optical line terminal connected to the optical transmission line, and N optical network units. Each optical network unit is connected to and communicates with the optical line terminal through the optical transmission line at one of M different wavelengths using a TDMA protocol, where N and M are integers and 1<M<N.

According to yet another aspect of the present invention, in a passive optical network having an optical line terminal and a first plurality of optical network units passively connected to the optical line terminal through an optical transmission line, the first plurality of optical network units communicating with the optical line terminal at a first wavelength using a TDMA protocol, the improvement comprising a second plurality of optical network units passively connected to the optical line terminal through the same optical transmission line as the first plurality of optical network units, the second plurality of optical network units communicating with the optical line terminal at a second wavelength different than the first wavelength using a TDMA protocol.

According to still another aspect of the present invention, a method of grouping optical transmitters for use in an optical communication network includes the steps of providing a plurality of optical transmitters having the same nominal wavelength, determining the operating wavelength for each of the optical transmitters, and separating the plurality of optical transmitters into a plurality of different groups according to the determined operating wavelengths.

Other features and advantages of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF PREFERRED EMBODIMENTS

Figure 1A:
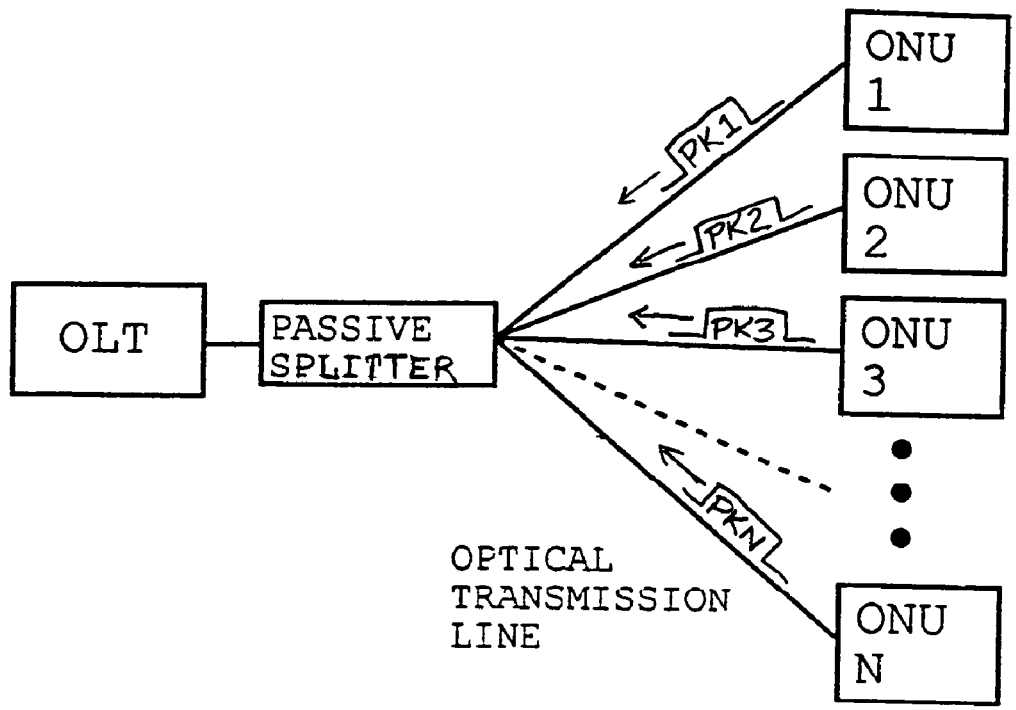
FIG. 1A is a block diagram of a prior art passive optical network using a TDMA protocol for upstream communications.
Figure 1B:
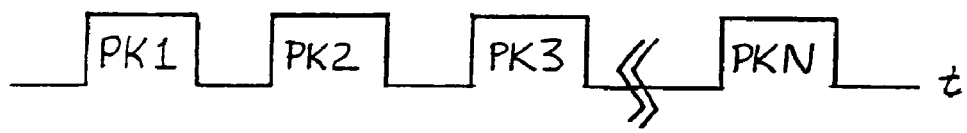
FIG. 1B illustrates the TDMA data stream that is sent upstream to the optical line terminal (OLT) in the optical network of FIG. 1A.
Figures 2A, 2B, 2C:
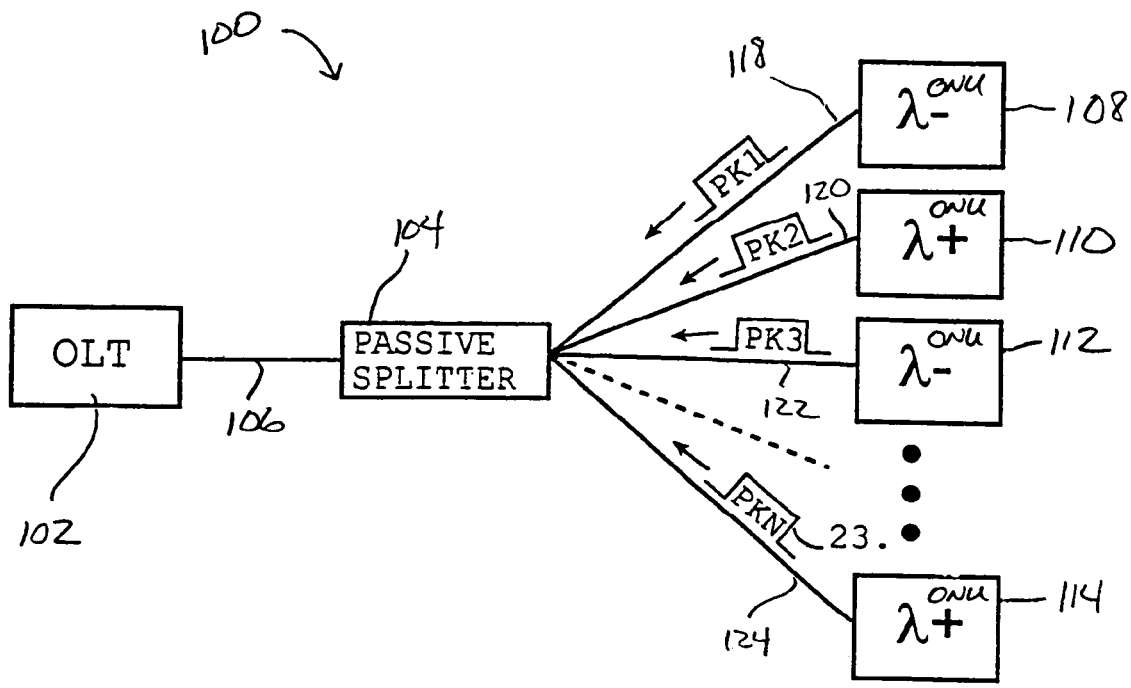
FIG. 2A is a block diagram of an exemplary passive optical network using two TDMA data streams at different wavelengths according to the present invention.
FIGS. 2B and 2C illustrate the two TDMA data streams that are sent upstream through the same optical transmission line in the exemplary optical network of FIG. 2A.

A multiple wavelength TDMA optical network according to one exemplary embodiment of the invention is shown in FIG. 2A and indicated generally by reference character 100. Similar to the prior art optical network shown in FIG. 1A, the exemplary optical network 100 shown in FIG. 2A includes an optical line terminal (OLT) 102 connected to a passive splitter 104 through an optical transmission line 106 (e.g., optical fiber). The optical network 100 also includes several exemplary optical network units (ONUs) 108, 110, 112, 114 each connected to the passive splitter 104 through an associated optical transmission line 118, 120, 122, 124.

Each ONU is configured to send data packets PK1, PK2, . . . , or PKN in the upstream direction (i.e., toward the OLT 102) at an appropriate time using a TDMA protocol. These data packets pass through the passive optical splitter 104 and ultimately arrive at the OLT 102 through the optical transmission line 106. In contrast to the prior art, the exemplary ONUs 108-114 do not all communicate with the OLT 102 using the same wavelength. Instead, each ONU is assigned to one of two distinct TDMA groups, with each TDMA group using a wavelength different than that of the other TDMA group. As shown in FIG. 2A, some ONUs 108, 112 communicate with the OLT 102 at a wavelength $\lambda-$, while other ONUs 110, 114 communicate with the OLT 102 at a wavelength $\lambda+$ that is longer than the wavelength $\lambda-$. As a result, two TDMA data streams travel over the same optical transmission line 106 to the OLT 102; one at the wavelength $\lambda-$ as illustrated in FIG. 2B, and one at the wavelength $\lambda+$ as illustrated in FIG. 2C. While, in the exemplary network 100 shown in FIG. 2A, only two ONUs are assigned to each TDMA group, those skilled in the art will recognize that this is for illustrative purposes only and that, in many specific implementations of the invention, greater than two ONUs will be assigned to one or more of the TDMA groups.

As further explained below, the OLT 102 receives both TDMA data streams and separates them by wavelength to two different detectors. By using this inventive approach which involves two (or more) TDMA groups operating at different wavelengths, the bandwidth of the exemplary network 100, and thus the bandwidth allocated to each ONU, can be increased without increasing data transmit speeds between the ONUs and the OLT. This is because multiple ONUs can now send data packets to the OLT 102 at the same time, provided that they transmit data at different wavelengths. Synchronization guard bands may also be made long enough in time to permit detector signal recovery using low cost, low speed electronic circuitry in the OLT 102, as well as low cost, low speed optical transmitters in the ONUs 108-114. In this manner, the present invention provides for a passive optical network having an increased bandwidth while using low cost components. As should be apparent, the invention can also be used to increase the bandwidth of higher cost, higher speed networks.

Figure 3:
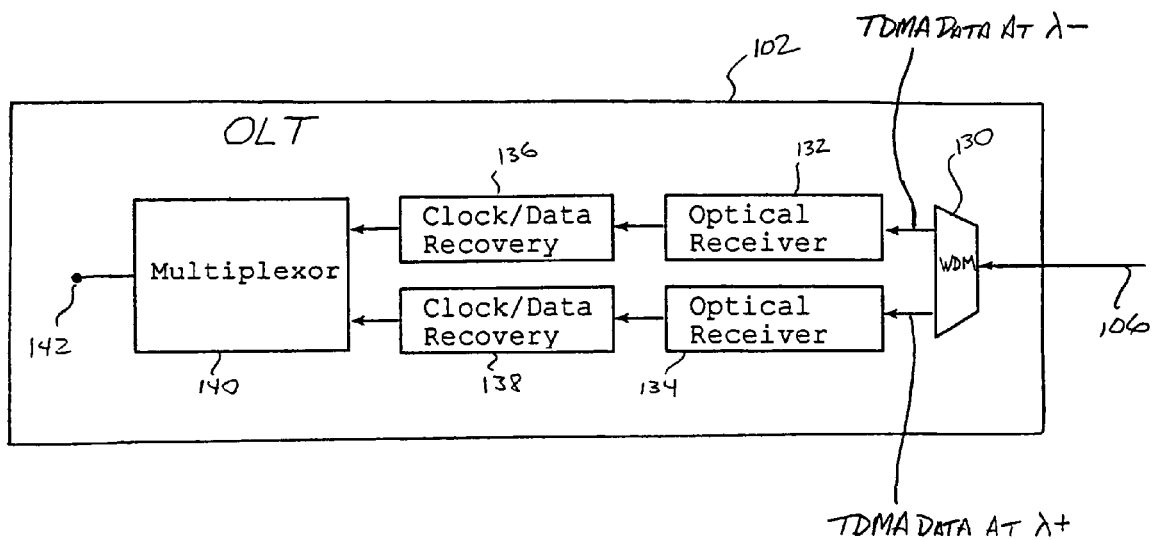
FIG. 3 is a block diagram of the optical line terminal used in the exemplary network of FIG. 2A.

The internal functions of the preferred OLT 102 will now be described with reference to FIG. 3. As shown therein, the OLT 102 preferably includes a wavelength demultiplexer (WDM) 130, which is preferably a passive optical component, a pair of optical receivers (also called optical detectors) 132, 134, a pair of clock/data recovery circuits 136, 138, and a multiplexer 140. The WDM 130 preferably receives the TDMA data streams shown in FIGS. 2B and 2C through the optical transmission line 106, and separates these data streams into two separate channels. The TDMA data stream of wavelength $\lambda-$ is routed to the optical receiver 132, while the TDMA data steam of wavelength $\lambda+$ is routed to the optical receiver 134, as shown in FIG. 3. Preferably, the wavelengths $\lambda-$ and $\lambda+$ are sufficiently separated from one another (e.g., by greater than 30 dB) so that the WDM 130 can provide each of the TDMA data streams to one of the optical receivers 132, 134 without harmful noise. Each independent TDMA data stream is processed by one of the optical receivers 132, 134 and one of the clock/data recovery circuits 136, 138 in a conventional manner. The data steams are then multiplexed together to a common data receiving point 142 using the multiplexer 140. As will be apparent to those skilled in the art, the multiplexer 140 may include buffers for delaying any data packets received out of order by the multiplexer 140.

Although only two TDMA groups are utilized in the exemplary optical network 100 described above, it should be apparent that more than two groups can likewise be used. Additional TDMA groups at additional wavelengths are preferably supported by replacing the WDM 130 and the multiplexer 140 shown in FIG. 3 with similar components capable of demultiplexing and multiplexing, respectively, more than two data channels, and by adding an additional optical receiver and an additional clock/data recovery circuit for each additional TDMA wavelength group beyond the two groups described above.

It should also be noted that although every other ONU in FIG. 2A is assigned to the same TDMA group, this was done for illustrative purposes only and is not a requirement or limitation of the present invention.

Figure 4:
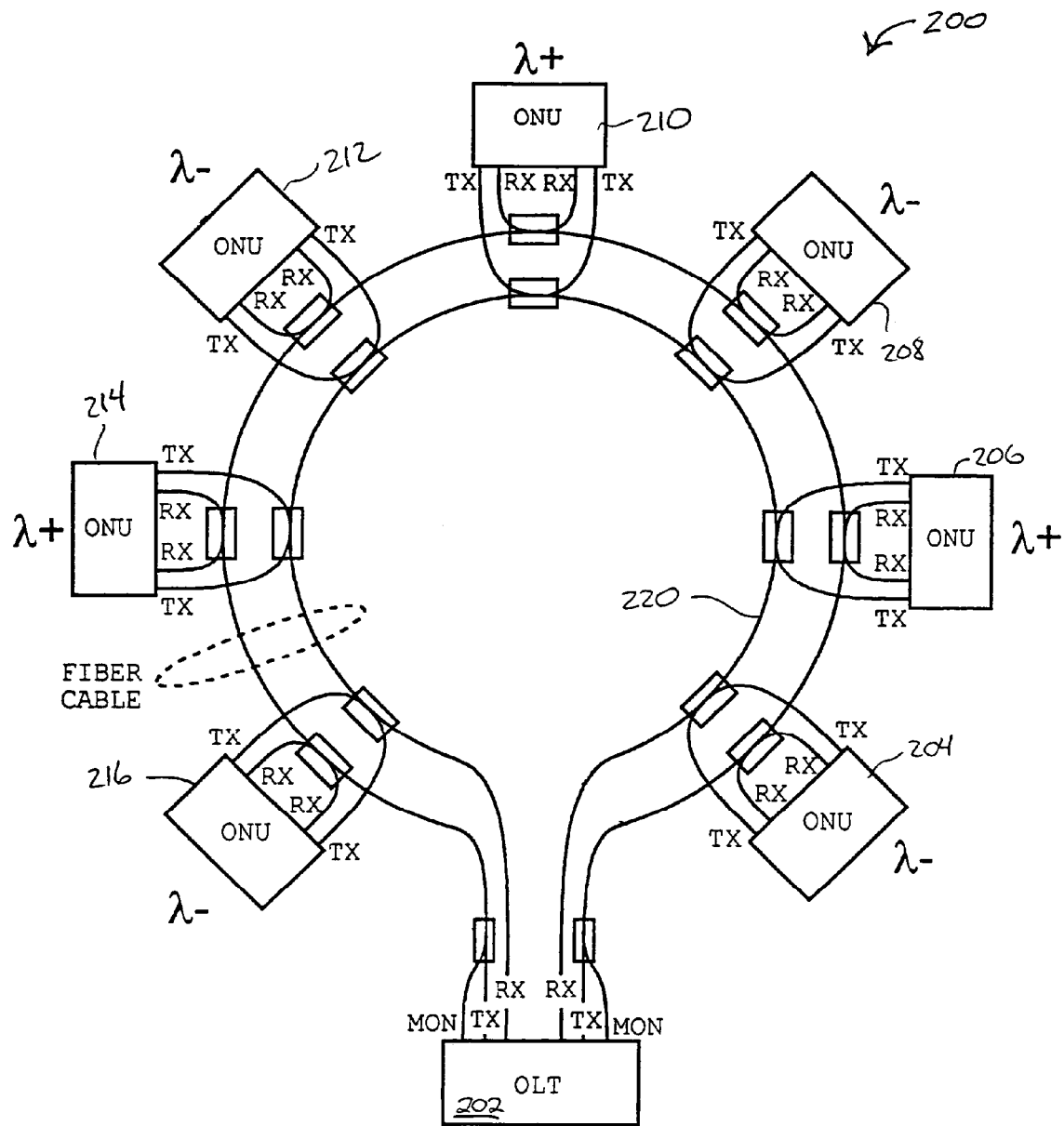
FIG. 4 is a block diagram of an exemplary optical network employing a fault tolerant redundant ring architecture and using two TDMA data streams at different wavelengths according to the present invention.

As will be apparent to those skilled in the art, while the exemplary optical network 100 described above employs a tree architecture, the teachings of the present invention are applicable to all point-to-multipoint topologies including ring and bus architectures. An exemplary implementation of the present invention in an optical network having a fault tolerant redundant ring architecture is illustrated in FIG. 4 and indicated generally by reference character 200. As shown in FIG. 4, the network 200 includes an OLT 202 with which several ONUs 204-216 communicate redundantly and bidirectionally through an optical transmission line 220. Similar to the optical network 100 described above with reference to FIG. 2A, each ONU of the optical network 200 is configured to communicate with the OLT 202 using a TDMA protocol at one of two different wavelengths λ− and λ+. Thus, in the optical network 200 of FIG. 4, two (or more) TDMA data streams are preferably used to communicate data from the ONUs 204-216 to a common OLT data entrance point. For purposes of redundancy, the OLT 202 shown in FIG. 4 preferably includes two sets of the components shown in FIG. 3, with each set connected to one end of the optical transmission line 220. Additional details of the optical network 200 and the preferred manner in which the ONUs 204-216 are passively coupled to the optical transmission line 220 are described in U.S. application Ser. No. 09/568,358 filed May 10, 2000, the entire disclosure of which is incorporated herein by reference.

The ONUs included in the exemplary optical networks 100, 200 described above are preferably provided with low cost laser diodes for communicating upstream using a TDMA protocol at one of the wavelengths λ− and λ+. This can be accomplished by providing laser diodes having a nominal (i.e., rated) wavelength of λ− and laser diodes having a nominal wavelength of λ+, as should be apparent. Alternatively, a number of low cost laser diodes having the same nominal wavelength can be tested and separated into two or more distinct wavelength groups according to the present invention. This is because the actual operating wavelength of a laser diode often varies by as much as 20 nm or more from its nominal wavelength. For example, the range of actual operating wavelengths for laser diodes rated at 1310 nm exceeds 1290 nm to 1330 mm.

Figure 5A:
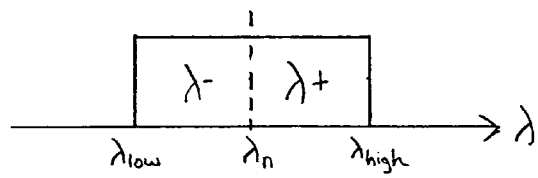
FIGS. 5A and 5B are spectral diagrams for illustrating how several laser diodes having the same nominal wavelength can be separated into two or more different wavelength groups according to the actual operating wavelengths of such diodes.

As shown in FIG. 5A, a laser diode having a nominal wavelength of λn may have an operating wavelength anywhere in the spectral window extending from λlow to λhigh. Thus, once the actual operating wavelength of the laser diode is determined, that diode can be separated into one of two different wavelength groups λ− or λ+ according to whether its actual operating wavelength is greater or less than some reference wavelength, such as the nominal wavelength λn as shown in FIG. 5A.

Figure 5B:
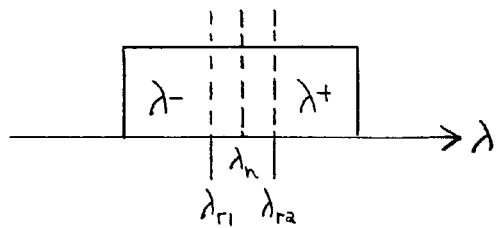

In the case where some degree of isolation is needed between the wavelength groups λ− and λ+, the actual operating wavelength of a particular laser diode can be compared with two reference wavelengths λr1 and λr2, as shown in FIG. 5B. Thus, a laser diode having an operating wavelength less than both reference wavelengths λr1 and λr2 can be separated into wavelength group λ−, and a laser diode having an operating wavelength greater than both reference wavelengths λr1 and λr2 can be separated into wavelength group λ+. Laser diodes having operating wavelengths falling between the reference wavelengths λr1 and λr2 are preferably separated into a third wavelength group, and such diodes are preferably not used in combination with the diodes separated into wavelength group λ− or λ+ for optical networks requiring a degree of isolation (represented by the difference of the reference wavelengths λr1 and λr2) between each wavelength group.

As used herein, wavelength λ+ refers to a wavelength that is longer than wavelength λ−, and wavelength λ− refers to a wavelength that is shorter than wavelength λ+; no specific wavelength values are intended. The particular values that should be assigned to wavelengths λ− and λ+ in any given implementation of the invention is a matter of design choice. It should also be understood that wavelengths in a relatively narrow spectral range (e.g., wavelengths that would be grouped together by the WDM 130 shown in FIG. 3) are considered the same wavelength for purposes of this disclosure. Thus, wavelength λ− (also called a "first wavelength") may represent a group of wavelengths in a relatively narrow spectral range that does not overlap with another relatively narrow spectral range of wavelengths that may comprise the wavelength λ+ (also called a "second wavelength").

When introducing elements of the present invention or the preferred embodiments thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. An optical communication network comprising:
   a. an optical transmission line;
   b. an optical line terminal connected to the optical transmission line;
   c. a first plurality of optical network units each connected to the optical line terminal and configured for optically transmitting TDMA signals of a first wavelength to the optical line terminal through said optical transmission line; and
   d. at least a second plurality of optical network units each connected to the optical line terminal and configured for optically transmitting TDMA signals of a second wavelength different than the first wavelength to the optical line terminal through said optical transmission line.

2. The optical communication network of a claim 1 wherein the optical line terminal includes a first optical receiver for receiving the TDMA signals of the first wavelength, and a second optical receiver for receiving the TDMA signals of the second wavelength.

3. The optical communication network of claim 2 wherein the optical line terminal includes at least one wavelength division multiplexer connected to the optical transmission line for routing the TDMA signals of the first wavelength to the first optical receiver and the TDMA signals of the second wavelength to the second optical receiver.

4. The optical communication network of claim 2 wherein the optical line terminal includes first and second recovery circuits connected to the first and second optical receivers, respectively.

5. The optical communication network of claim 4 wherein the optical line terminal includes a multiplexer connected to the outputs of the first and second recovery circuits for multiplexing output data to a common data receiving point.

6. The optical communication network of claim 5 wherein the multiplexer includes buffers for selectively buffering said output data.

7. The optical communication network of claim 1 wherein the optical transmission line is fiber optic line.

8. An optical communication network comprising an optical transmission line, an optical line terminal connected to the optical transmission line, and N optical network units, each of the optical network units being connected to an communicating with the optical line terminal through the optical transmission line at one of M different wavelengths using a TDMA protocol, where N and M are integers and 1<M<N.

9. The optical communication network of claim 8 wherein M is two.

10. The optical communication network of claim 8 wherein M is greater than two.

11. In a passive optical network having an optical line terminal and a first plurality of optical network units passively connected to the optical line terminal through an optical transmission line, the first plurality of optical network units communicating with the optical line terminal at first wavelength using a TDMA protocol, an improvement comprising a second plurality of optical network units passively connected to the optical line terminal through the same optical transmission line as the first plurality of optical network units, the second plurality of optical network units communicating with the optical line terminal at a second wavelength different than the first wavelength using a TDMA protocol.

12. The passive optical network of claim 11 wherein the network has an architecture selected from the group consisting of ring, tree and bus architectures.

13. A method of grouping optical transmitters for use in an optical communication network, the method comprising the steps of:
   a. providing a plurality of optical transmitters having the same nominal wavelength;
   b. determining the operating wavelength for each of said optical transmitters;
   c. separating the plurality of optical transmitters into a plurality of different groups according to the determined operating wavelengths; and
   d. wherein the separating step includes identifying at least one reference wavelength and assigning each of the optical transmitters to one of the different groups according to whether its operating wavelength is greater or less than said reference wavelength.

14. The method of claim 13 wherein the separating step includes identifying at least two reference wavelengths and assigning each of the optical transmitters to one of at least three different groups according to whether its operating wavelength is greater or less than each of said two reference wavelengths.

15. The method of claim 13 wherein said three groups include a first group for optical transmitters having operating wavelengths less than both of the two reference wavelengths, a second group for optical transmitters having operating wavelengths greater than both of the two reference wavelengths, and a third group for optical transmitters having operating wavelengths between the two reference wavelengths, the method further comprising the step of using optical transmitters from the first group and the second group, but not the third group, to configure a plurality of optical network units for optically transmitting signals in one of a first wavelength range and second wavelength range and second wavelength range, respectively, in a particular optical network.

16. The method of claim 13 further comprising the step of using one of the groups of optical transmitters to configure a first plurality of optical network units for optically transmitting signals in a first wavelength range, and using another of the groups of optical transmitters to configure a second plurality of optical network units for optically transmitting signals in second wavelength range.

17. The method of claim 15 wherein said signals are TDMA signals.

18. The method of claim 13 wherein the optical transmitters are laser diodes.

19. The method of claim 13 wherein the providing step includes providing a plurality of commercially available optical transmitters having the same nominal wavelength.

* * * * *